US011343211B2

(12) United States Patent
Nelson et al.

(10) Patent No.: US 11,343,211 B2
(45) Date of Patent: May 24, 2022

(54) DIGITAL NETWORKING IN A WELDING SYSTEM

(71) Applicant: ILLINOIS TOOL WORKS INC., Glenview, IL (US)

(72) Inventors: Andrew D. Nelson, Appleton, WI (US); Peter Donald Mehn, Oshkosh, WI (US); Randy Alan DeCoster, Appleton, WI (US); James D. Borowski, Greenville, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 56 days.

(21) Appl. No.: 16/289,343

(22) Filed: Feb. 28, 2019

(65) Prior Publication Data

US 2019/0199662 A1    Jun. 27, 2019

Related U.S. Application Data

(63) Continuation of application No. 14/022,311, filed on Sep. 10, 2013, now Pat. No. 10,270,719.

(51) Int. Cl.
*H04L 51/06* (2022.01)
*H04L 101/672* (2022.01)
(Continued)

(52) U.S. Cl.
CPC ........ *H04L 51/06* (2013.01); *H04L 29/06544* (2013.01); *H04L 29/08558* (2013.01);
(Continued)

(58) Field of Classification Search
None
See application file for complete search history.

(56) References Cited

U.S. PATENT DOCUMENTS 4,422,171 A * 12/1983 Wortley ............. H04B 7/18513
375/E7.016
6,006,254 A * 12/1999 Waters ................ H04L 12/1868
709/204
(Continued)

FOREIGN PATENT DOCUMENTS

CN    1938997 A    3/2007
CN    1938997 B    3/2007
(Continued)

OTHER PUBLICATIONS

Criticism of Wikipedia, https://en.wikipedia.org/wiki/Criticism_of_Wikipedia (last edited on Oct. 28, 2021). (Year: 2021).*
(Continued)

*Primary Examiner* — Lance Leonard Barry
(74) *Attorney, Agent, or Firm* — McAndrews, Held & Malloy, Ltd.

(57) ABSTRACT

A method for handling a data packet includes a network device receiving the data packet. The method also includes the network device separating first network layer data of the data packet from message data of the data packet. The message data of the data packet includes a source address represented by less than four bytes, a destination address represented by less than four bytes, and a format identifier. The method includes determining whether the destination address of the message data matches an address of the network device or whether the message data indicates a broadcast message. The method also includes the network device processing the format identifier if the destination address of the message data matches the address of the network device or if the message data indicates the broadcast message. The method includes the network device providing the message data to the network device and/or other network devices.

18 Claims, 4 Drawing Sheets

(51) Int. Cl.
  *H04L 67/12* (2022.01)
  *H04L 67/565* (2022.01)
  *H04L 69/00* (2022.01)
  *H04L 61/103* (2022.01)
  *H04L 61/5038* (2022.01)
(52) U.S. Cl.
  CPC .......... *H04L 61/6072* (2013.01); *H04L 67/12* (2013.01); *H04L 67/2823* (2013.01); *H04L 61/103* (2013.01); *H04L 61/2038* (2013.01)

(56) References Cited

U.S. PATENT DOCUMENTS

| | | | | |
|---|---|---|---|---|
| 6,498,787 | B1* | 12/2002 | Yi | H04M 15/58 370/328 |
| 6,625,124 | B1* | 9/2003 | Fan | H04L 29/12009 370/235 |
| 6,636,513 | B1* | 10/2003 | Nishikawa | H04L 12/56 370/395.1 |
| 6,956,852 | B1* | 10/2005 | Bechtolsheim | H04L 12/4633 370/389 |
| 7,026,929 | B1* | 4/2006 | Wallace | G08B 25/003 340/539.13 |
| 7,873,028 | B2* | 1/2011 | Lam | H04L 67/025 370/352 |
| 8,018,932 | B1* | 9/2011 | Eli | H04L 12/18 370/390 |
| 2002/0178273 | A1* | 11/2002 | Pardo-Castellote | H04L 29/06 709/230 |
| 2003/0095548 | A1* | 5/2003 | Yamano | H04L 45/04 370/389 |
| 2004/0029598 | A1* | 2/2004 | Guggisberg | H04L 51/066 455/466 |
| 2004/0193876 | A1* | 9/2004 | Donley | H04L 63/1458 713/162 |
| 2006/0062160 | A1* | 3/2006 | Kim | H04L 12/66 370/257 |
| 2006/0072594 | A1* | 4/2006 | Swamy | H04L 12/18 370/409 |
| 2006/0251028 | A1* | 11/2006 | Nagata | H04L 5/1438 370/338 |
| 2008/0019387 | A1* | 1/2008 | Kim | H04L 61/103 370/401 |
| 2008/0049621 | A1* | 2/2008 | McGuire | H04L 12/4645 370/236.2 |
| 2008/0140815 | A1 | 6/2008 | Brant | |
| 2010/0049865 | A1* | 2/2010 | Hannuksela | H04N 21/234327 709/231 |
| 2010/0110926 | A1* | 5/2010 | Pattenden | H04L 29/06 370/252 |
| 2011/0240620 | A1* | 10/2011 | Ott | B23K 9/1087 219/130.5 |
| 2012/0097644 | A1* | 4/2012 | Ott | B23K 9/124 219/108 |
| 2012/0140731 | A1* | 6/2012 | Drapkin | H04W 12/041 370/331 |
| 2012/0147902 | A1* | 6/2012 | Kim | H04W 28/06 370/474 |
| 2012/0177044 | A1* | 7/2012 | Berman | H04L 12/4625 370/392 |
| 2012/0245786 | A1* | 9/2012 | Fedorchuk | H04L 69/18 701/29.1 |
| 2013/0288211 | A1* | 10/2013 | Patterson | G09B 19/24 434/234 |
| 2014/0192804 | A1* | 7/2014 | Ghanwani | H04L 12/18 370/390 |
| 2014/0341234 | A1* | 11/2014 | Asterjadhi | H04W 84/12 370/474 |
| 2015/0071067 | A1* | 3/2015 | Martin | H04L 41/0659 370/235 |
| 2016/0056905 | A1* | 2/2016 | Hartlmueller | H04J 3/0697 375/354 |
| 2017/0334014 | A1* | 11/2017 | Daniel | B23K 9/0956 |

FOREIGN PATENT DOCUMENTS

CN 101114975 1/2008
GB 2415855 1/2006

OTHER PUBLICATIONS

International Search Report from PCT application No. PCT/US2014/047497, dated Nov. 12, 2014, 13 pgs.

* cited by examiner

DIGITAL NETWORKING IN A WELDING SYSTEM

CROSS REFERENCE TO RELATED APPLICATIONS

This application claims priority to, and is a continuation of, co-pending U.S. application Ser. No. 14/022,311, entitled "DIGITAL NETWORKING IN A WELDING SYSTEM," having a filing date of Sep. 10, 2013, which is incorporated herein by reference in its entirety.

BACKGROUND

The invention relates generally to welding systems and, more specifically, to digital networking within a welding system.

Welding-related devices, such as welding power supplies, welding wire feeders, welding torches, welding helmets, welding control pendants, welding foot pedals, and other electronic devices, are often electronically coupled together in a welding system. The welding-related devices may include network devices that are used to control the devices, and to facilitate communication between the devices. For example, network devices may enable certain devices in the welding system to communicate together using a network medium and a network protocol, such as Ethernet, universal serial bus (USB), and/or other serial communication architectures (e.g., RS-232, RS-422, etc.). Unfortunately, devices in the welding system that are on different networks may be unable to communicate together. Furthermore, certain communication architectures may be difficult to implement using certain network devices, such as embedded systems.

BRIEF DESCRIPTION

In one embodiment, a method for handling a data packet includes receiving, at a network device, the data packet. The method also includes separating, by the network device, first network layer data of the data packet from message data of the data packet. The message data of the data packet includes a source address represented by less than four bytes, a destination address represented by less than four bytes, and a format identifier. The method includes determining whether the destination address of the message data matches an address of the network device or whether the message data indicates a broadcast message. The method also includes processing, by the network device, the format identifier if the destination address of the message data matches the address of the network device or if the message data indicates the broadcast message. The method includes providing, by the network device, the message data to the network device, one or more other network devices, or some combination thereof.

In another embodiment, a network device includes a processing device configured to form message data. The message data includes a source address represented by less than four bytes, a destination address represented by less than four bytes, and a format identifier. The network device also includes a network interface device configured to receive the message data from the processing device, to combine the message data with network layer data to form a data packet, and to provide the data packet from the network device to one or more other network devices using one or more network media.

In a further embodiment, a welding system includes a first network device configured to receive a first data packet and to separate first network layer data of the first data packet from message data of the first data packet. The message data of the first data packet includes a source address represented by less than four bytes, a destination address represented by less than four bytes, and a format identifier. The first network device is configured to determine whether the destination address of the message data matches an address of the network device or whether the message data indicates a broadcast message, to process the format identifier if the destination address of the message data matches the address of the first network device or if the message data indicates the broadcast message, and to package the message data in a second data packet with second network layer data. The welding system also includes a second network device configured to receive the second data packet if the destination address of the message data does not match the address of the first network device or if the message data indicates the broadcast message.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
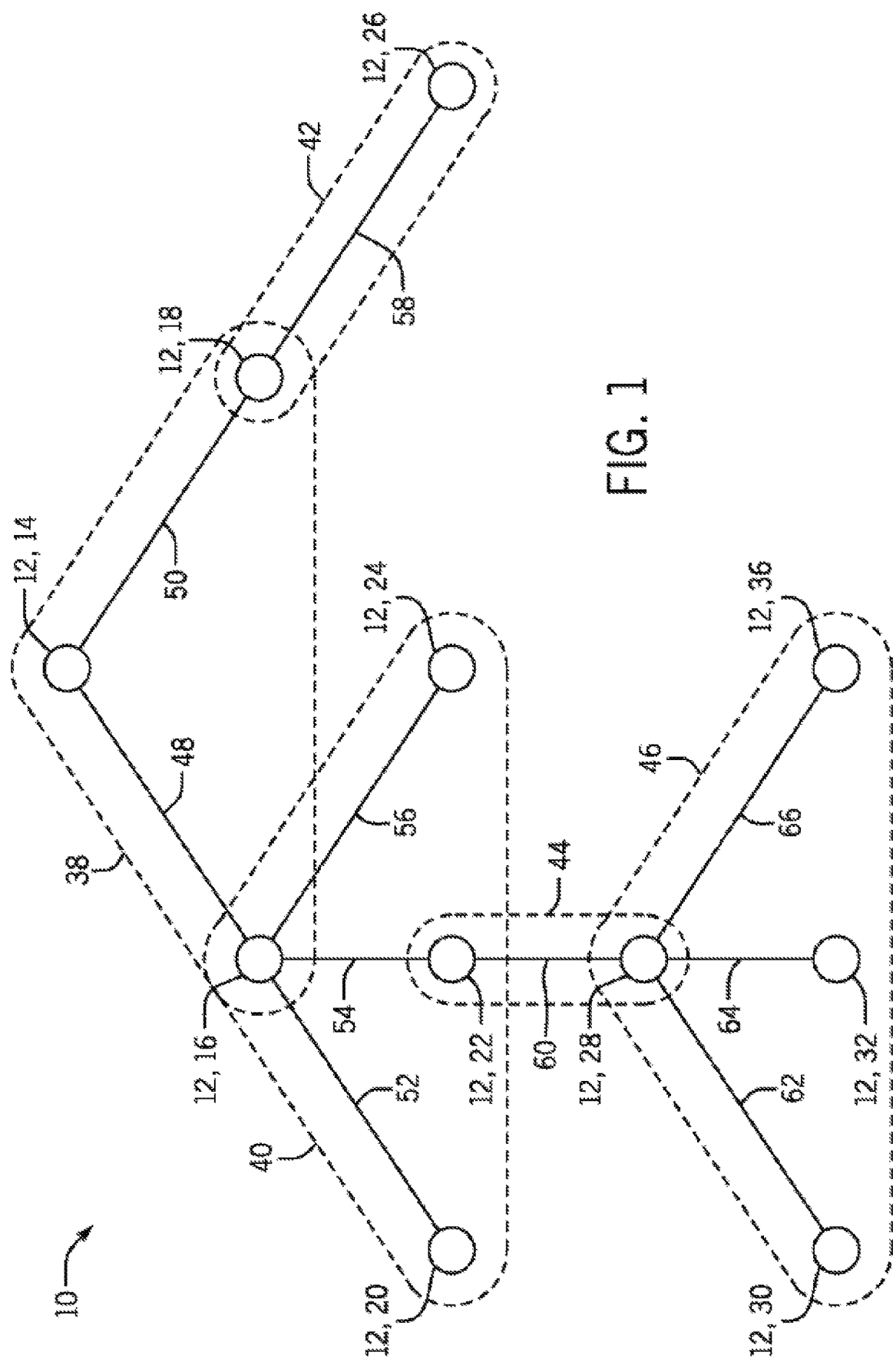
FIG. 1 is a diagram of an embodiment of a welding system that enables communication between network devices in different internal networks of the welding system, in accordance with embodiments of the present disclosure.

Turning to the drawings, FIG. 1 is a diagram of an embodiment of a welding system 10 that enables communication between network devices 12 in different internal networks of the welding system 10. As may be appreciated, each network device 12 may be an embedded system, such as a computer system with a dedicated function within the welding system 10. In certain embodiments, one or more network devices 12 may be sensors. Moreover, the network devices 12 may be part of welding-related devices and may include a processor, electronic components, and/or control circuitry to control operation of various tasks. Each network device 12 may be part of separate welding-related devices and/or a welding-related device may include more than one network device 12. As illustrated, the welding system 10 includes network devices 14, 16, 18, 20, 22, 24, 26, 28, 30, 32, 34, and 36. All of the network devices 12 may be disposed in one of a welding power supply, welding wire feeder, welding torches, welding helmets, welding control pendants, welding foot pedals, and so forth.

Each of the network devices 14, 16, 18, 20, 22, 24, 26, 28, 30, 32, 34, and 36 are part of one or more internal networks. Specifically, a first internal network 38 includes the network devices 14, 16, and 18. Within the internal network 38, the network device 14 may function as a router for the internal network 38. As the router, the network device 14 controls routing of data to a particular network device 12 within the internal network 38. Moreover, the network device 14 may also function as a master device (e.g., root node) for the welding system 10. As the master node, the network device 14 controls assignment of addresses to all of the network devices 14, 16, 18, 20, 22, 24, 26, 28, 30, 32, 34, and 36 of the welding system 10.

A second internal network 40 includes the network devices 16, 20, 22, and 24. Within the internal network 40, the network device 16 may function as a router for the internal network 38. Moreover, a third internal network 42 includes the network devices 18 and 26. Within the internal network 42, the network device 18 may function as a router for the internal network 42. Furthermore, a fourth internal network 44 includes the network devices 22 and 28. Within the internal network 44, the network device 22 may function as a router for the internal network 44. A fifth internal network 46 includes the network devices 28, 30, 32, and 34. Within the internal network 46, the network device 28 may function as a router for the internal network 46.

As may be appreciated, the routers may function as bridging devices between different internal networks 36, 38, 40, 42, and 44, thereby facilitating data transfer between the internal networks 36, 38, 40, 42, and 44. For example, for data to be communicated from the network device 30 to the network device 22, the network device 28 provides a bridge between the two internal networks 44 and 46. Accordingly, the network device 30 may communicate with the network device 22. In a similar manner, any of the network devices 12 of the welding system 10 may, communicate with any other network device 12 of the welding system 10. The internal networks 38, 40, 42, 44, and 46 may be any suitable type of network, such as Ethernet, universal serial bus (USB), Modbus®, local operation network (LonWorks), DeviceNet, controller area network (CAN), another serial based network, and so forth.

As illustrated, network connections 48, 50, 52, 54, 56, 58, 60, 62, 64, and 66 are used to connect the network devices 14, 16, 18, 20, 22, 24, 26, 28, 30, 32, 34, and 36 together. Moreover, the network connections 48, 50, 52, 54, 56, 58, 60, 62, 64, and 66 may be any suitable network media, such as cables, wires, wireless data routes, and so forth. For example, the network media may include Ethernet cables, network cables, coax cables, serial communication cables, and so forth. In certain embodiments, the internal networks 38, 40, and 46 represent Ethernet based networks, while the internal networks 42 and 44 represent USB based networks. As may be appreciated, the welding system 10 may have any suitable number of network devices 12 and/or any number of internal networks 36, 38, 40, 42, and 44.

Figure 2:
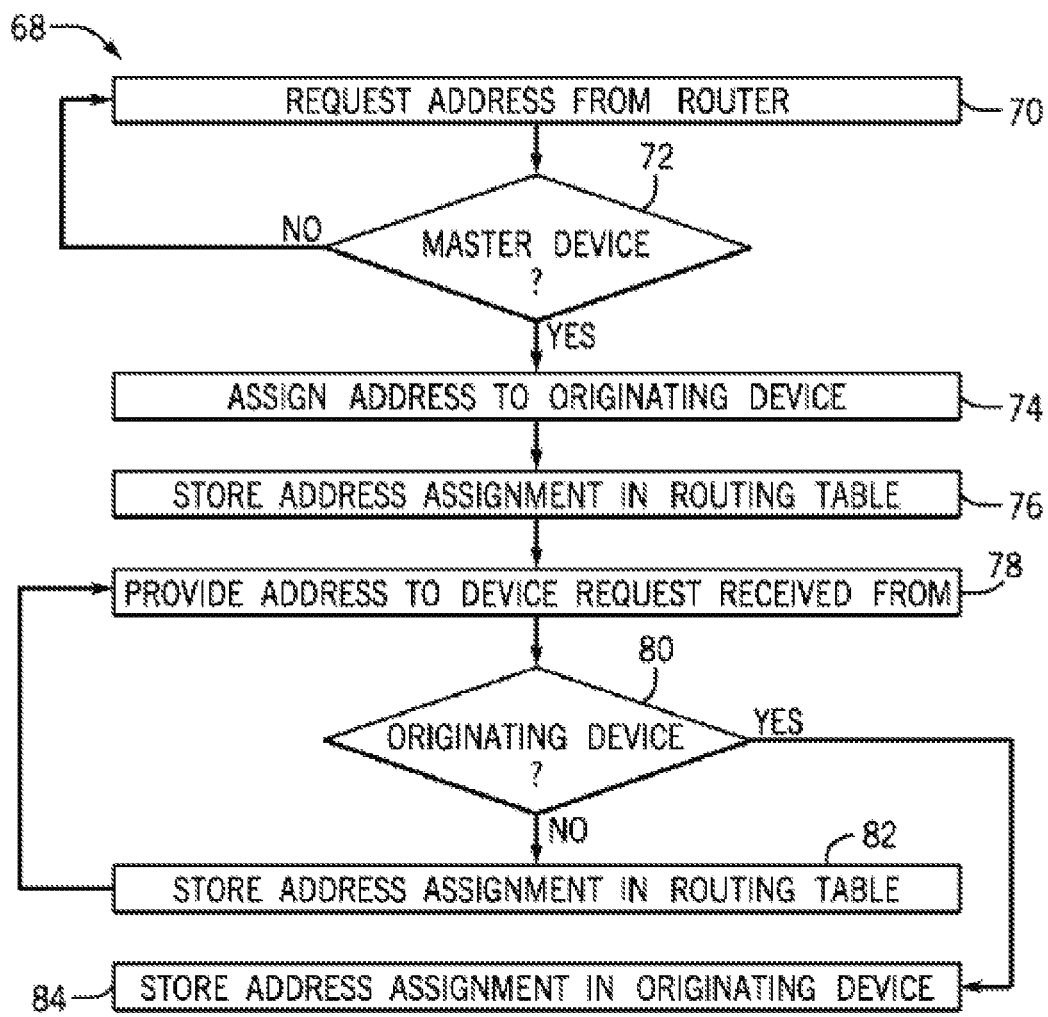
FIG. 2 is a flow chart of an embodiment of a method for assigning addresses in a welding system having network devices in different internal networks, in accordance with embodiments of the present disclosure.

FIG. 2 is a flow chart of an embodiment of a method 68 for assigning addresses in the welding system 10 having network devices 12 in different internal networks 36, 38, 40, 42, and 44. As may be appreciated, each network device 12 may be assigned a unique system address for use in communicating within the welding system 10. In certain embodiments, the address may be formed from approximately one byte of data. Accordingly, in such an embodiment, 256 different addresses may be assigned. As illustrated by the method 68, a network device 12 sends an address request to a router of an internal network that the network device 12 is part of (block 70). For example, the network device 30 illustrated in FIG. 1 may send an address request to the network device 28. In certain embodiments, the network device 12 may broadcast an address request to all devices of the internal network. If the router is not the master device (e.g., the network device 14) of the welding system 10 as determined by block 72, the method 68 returns to block 70 and the router sends the address request to a higher level router. For example, the network device 28 illustrated in FIG. 1 is not a master device of the welding system 10, so the network device 28 sends the address request to the network device 22 (e.g., a higher level router). Moreover, the network device 22 is not a master device of the welding system 10, so the network device 22 sends the address request to the network device 16. Furthermore, the network device 16 is not a master device of the welding system 10, so the network device 16 sends the address request to the network device 14. As may be appreciated, each of the routers along the path from the network device 30 to the network device 14 may store a record of the path back to the network device 30 (e.g., the originating device). For example, if the internal network 46 is an Ethernet network, the network device 28 may store data in a route table indicating a type of network medium (e.g., Ethernet) by which data was received from the network device 30 in conjunction with a media access control (MAC) address (or some other identifier) corresponding to the network device 30.

If the router is the master device of the welding system 10 (e.g., the network device 14), the master device assigns an address to the originating device (block 74). Moreover, the master device stores a record of the address assignment (block 76). For example, the network device 14 may store an address assignment for the network device 30 in conjunction with a MAC address corresponding to the network device 30. The master device provides the assigned address to the device that the master device received the request from (block 78). For example, the network device 14 provides the assigned address for the network device 30 to the network device 16. A determination is made concerning whether the originating device has received the assigned address (block 80).

If the originating device has not received the assigned address, the network device 12 stores the received address assignment in its routing table (block 82), then returns to block 78. For example, the network device 16 may store an address for the network device 30 that is received from the network device 16. Then, the network device 16 may provide the address to the network device 22, and so forth. If the originating device has received the assigned address, the originating device stores the address assignment (block 84). For example, the network device 30 stores its address assignment after it is received. Accordingly, unique addresses may be assigned to network devices 12 in the welding system 10.

Figure 3:
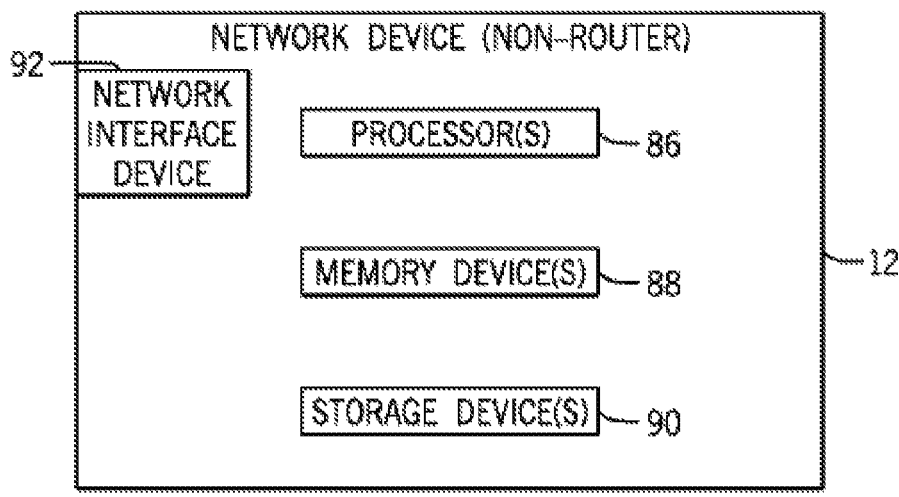
FIG. 3 is a block diagram of an embodiment of a network device that may operate as a non-routing device, in accordance with embodiments of the present disclosure.

FIG. 3 is a block diagram of an embodiment of a network device 12 that may operate as a non-routing device (e.g., non-router). The network device 12 may include one or more processors 86, memory devices 88, and/or storage devices 90. The processor(s) 86 may be used to execute software, such as data processing, welding operation quality determination, welding control, and so forth. Moreover, the processor(s) 86 may include one or more microprocessors, such as one or more "general-purpose" microprocessors, one or more special-purpose microprocessors and/or application specific integrated circuits (ASICS), or some combination thereof. For example, the processor(s) 86 may include one or more reduced instruction set (RISC) processors. In certain embodiments, the processor(s) 86 may be used to form message data for messages sent from the network device 12.

The storage device(s) 90 (e.g., nonvolatile storage) may include read-only memory (ROM), flash memory, a hard drive, or any other suitable optical, magnetic, or solid-state storage medium, or a combination thereof. The storage device(s) 90 may store data (e.g., welding data, address data, control data, message data, etc.), instructions (e.g., software or firmware for determining welding parameters, etc.), and any other suitable data.

The memory device(s) 88 may include a volatile memory, such as random access memory (RAM), and/or a nonvolatile memory, such as ROM. The memory, device(s) 88 may store a variety of information and may be used for various purposes. For example, the memory device(s) 88 may store processor-executable instructions (e.g., firmware or software) for the processor(s) 86 to execute, such as instructions for determining parameters of a welding operation.

The network device 12 also includes a network interface device 92 to enable the network device 12 to communicate with other devices on a network. The network interface device 92 may enable communication over a specific network (e.g., the internal networks 36, 38, 40, 42, and 44), such as Ethernet, USB, another serial communication network, and/or any other suitable network. Accordingly, the network interface device 92 enables the network device 12 to communicate with other network devices 12 that are part of the welding system 10. Moreover, in certain embodiments, the network interface device 92 may be configured to receive message data from the processor(s) 86, to combine the message data with network layer data to form a data packet, and to provide the data packet from the network device 12 to a second network device 12 using one or more network mediums.

Figure 4:
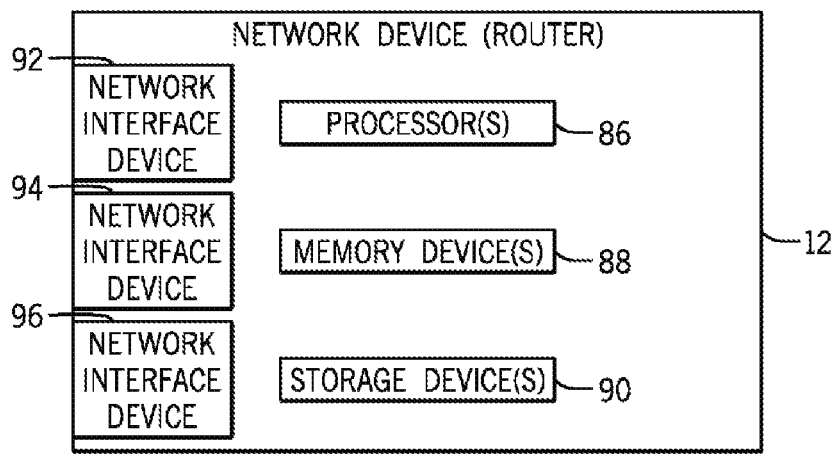
FIG. 4 is a block diagram of an embodiment of a network device that may operate as a routing device, in accordance with embodiments of the present disclosure.

FIG. 4 is a block diagram of an embodiment of a network device 12 that may operate as a routing device (e.g., router). In the illustrated embodiment, the network device 12 may include the one or more processors 86, the memory devices 88, and/or the storage devices 90. The network device 12 also includes the network interface device 92 for communicating with other devices on a network. Moreover, the network device 12 includes additional network interface devices 94 and 96. In certain embodiments, the multiple network interface devices 92, 94, and 96 enable the network device 12 to receive data from one network (e.g., the internal networks 36, 38, 40, 42, and 44) using the network interface device 92, and to provide data to another network (e.g., the internal networks 36, 38, 40, 42, and 44) using the network interface devices 94 and/or 96. Moreover, in some embodiments, the multiple network interface devices 92, 94, and 96 enable the network device 12 to route data within a single internal network, such as for routing to three different network devices 12.

Figure 5:
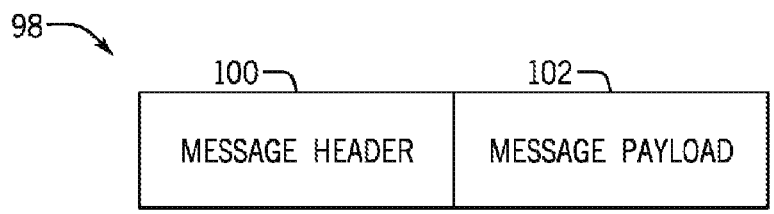
FIG. 5 is a block diagram of an embodiment of message data that may be provided by one network device to another network device, in accordance with embodiments of the present disclosure.
Figure 6:
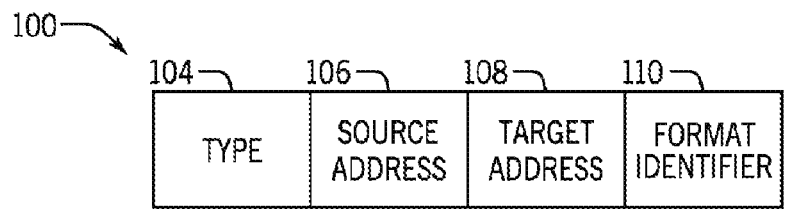
FIG. 6 is a block diagram of an embodiment of a message header of the message data of FIG. 5, in accordance with embodiments of the present disclosure.

FIG. 5 is a block diagram of an embodiment of message data 98 that may be provided by one network device 12 to another network device 12. As used herein, the message data 98 may refer to feedback data, configuration data, data files, any payload, and/or any suitable information sent from one device to another. The message data 98 includes a message header 100 and a message payload 102. In certain embodiments, the message header 100 may be provided and/or received first, followed by the message payload 102. Moreover, FIG. 6 is a block diagram of an embodiment of the message header 100 of the message data. 98 of FIG. 5. The message header 100 includes four different portions. Specifically, the message header 100 includes a type 104, a source address 106, a target address 108 (e.g., destination address), and a format identifier 110 (e.g., send display data, get data, get configuration, etc.). In certain embodiments, the type 104, the source address 106, the target address 108, and the format identifier 110 are each one byte such that the message header 100 is four bytes total. Accordingly, with such a message header 100, the message data 98 may be scalable (e.g., having a changeable size) and/or tunnelable (e.g., encapsulated within another network protocol). In certain embodiments, any of the type 104, the source address 106, the target address 108, and the format identifier 110 may be larger than one byte, yet still small enough to be scalable and/or tunnelable in certain networks. For example, in certain embodiments, the source address 106 and/or the target address 108 may each be greater than one byte and less than four bytes.

The type 104 may include a six bit tag, such as a wrapping counter used to represent a total number of messages sent from a network device 12. In certain embodiments, the wrapping counter may skip the value of zero. In such embodiments, the value of zero may identify a broadcast message, or a registered message. Moreover, in some embodiments, not all of the six bit tag may be used as part of the wrapping counter. For example, a network device 12 may choose to wrap 2, 3, 4, or 5 bits, and may use the remaining bits (e.g., high bits, low bits, etc.) to indicate an originating message source within the network device (e.g., a specific state machine or software module). In certain embodiments, responses to a command message having a specific six bit tag may include the same six bit tag in a response message header of the response.

Furthermore, the type 104 may include a seventh bit used to indicate whether the message data 98 is a command message or a response message. In certain embodiments, the seventh bit may also be used to indicate whether the message data 98 is a broadcast message or a registered message. In such embodiments, the six bit tag may be zero to indicate that the seventh bit represents either a broadcast or a registered message. Accordingly, using the six bit tag and the seventh bit, four types of messages may be used. First, a direct command, which is an unsolicited message sent from a source address to a target address. Second, a direct response, which is a reply sent from a source address to a requesting target address. Third, a broadcast message, which is a message from a source address to all addresses. Fourth, a registered message, which is a message identified by a registered message index (e.g., an identification of the registered message of the sending network device 12). Moreover, the type 104 may include an eighth bit used to indicate whether the message data 98 is intended for the welding system 10 as a whole or for a specific internal network 36, 38, 40, 42, 44. In certain embodiments, the eighth bit may be set to the internal network setting for a network device 12 to request an address. Moreover, a routing device may receive such an address request and forward the request to other internal networks 36, 38, 40, 42, 44 as discussed previously.

The source address 106 may be represented by eight bits and may be a unique address that corresponds to a network device 12 within the welding system 10 from which the message data 98 originates. In certain embodiments, the source address 106 may represent a registered message index, for a registered message based system. As may be appreciated, in a registered message based system, a network device 12 may request a registered message index from a master device before a registered message may be broadcast to other network devices 12. The target address 108 may also be represented by eight bits and may be a unique address that corresponds to a network device 12 within the welding system 10 for the message data 98 to be sent to. In certain embodiments, the target address 108 may correspond to a group of network devices 12, such as for a broadcast message. Moreover, the format identifier 110 may be represented by eight bits and may indicate a format of the data provided by the network device 12 with the target address 108.

As may be appreciated, embodiments in which the source address 106 and/or the target address 108 are a single byte, the message header 100 may be smaller than in other embodiments in which the source address 106 and/or the target address 108 are larger than one byte. Furthermore, the type 104, the source address 106, the target address 108, and the format identifier 110 may be sent and/or received in any suitable order. Moreover, the routable addressing enables the network devices 12 to share data with other network devices 12 without being aware of network protocols or physical communication media of the other network devices 12. Furthermore, the network devices 12 communicate without knowing whether multiple internal networks are involved in the communication.

Figure 7:
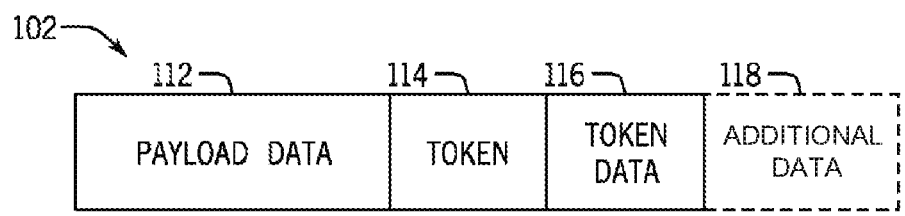
FIG. 7 is a block diagram of an embodiment of a message payload of the message data of FIG. 5, in accordance with embodiments of the present disclosure.

FIG. 7 is a block diagram of an embodiment of the message payload 102 of the message data 98 of FIG. 5. The message payload 102 includes payload data 112, a token 114, token data 116, and/or additional data 118. Specifically, the payload data 112 includes data that corresponds to the format identifier 110. As may be appreciated, the payload data 112 may include other identifiers (e.g., identifiers in addition to the format identifier 110) to be performed by the network device 12. In certain embodiments, the token 114 may be an item from a token list. The token list is a list of token values (e.g., unique numbers) that identify variables that may be read from or written to a network device 12. For example, a token value of six may represent a preset welding voltage. Moreover, in certain embodiments, an engineering unit may be part of the token list and may identify an engineering unit that corresponds to the token value, thereby reducing an amount of token data 116 communicated between network devices 12. The token data 116 may include any, suitable data that corresponds to the token 114. For example, the token data 116 may include a symbol from a symbol list, an engineering unit from an engineering unit list, and/or any other data from a list. Moreover, the symbol list may include a list of unique numbers identifying specific concepts, list items, text words, and/or phrases that may not be represented using single number. For example, a symbol six may represent "off" and a symbol twenty-three may represent "on." Furthermore, the engineering unit list may be a list (e.g., or a subset of the symbol list) that identifies engineering units and scales that binary values may be stored in. For example, a "0.1 Volt" engineering unit may represent 1.0 volts as 10 in binary data. Moreover, any number of tokens 114 and token data 116 may be included as represented by the additional data 118. As may be appreciated, the message payload 102 may be any suitable size enabled by a network transport layer.

Figure 8:
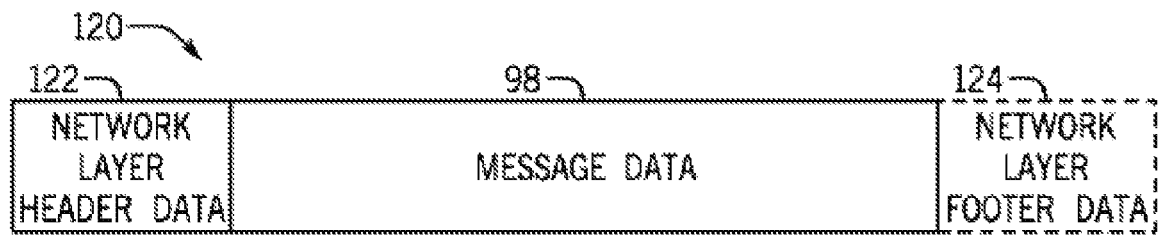
FIG. 8 is a block diagram of an embodiment of a data packet which includes the message data of FIG. 5, in accordance with embodiments of the present disclosure.

FIG. 8 is a block diagram of an embodiment of a data packet 120 which includes the message data 98 of FIG. 5. As illustrated, the data packet 120 includes network layer header data 122 and the message data 98. In certain embodiments, the data packet 120 also includes network layer footer data 124. The network layer header data 122 and/or the network layer footer data 121 is packaged with the message data 98 by the network device 12 before the network device 12 provides the data packet 120 to another network device 12 in the welding system 10 (e.g., using one of the network interface devices 92, 94, and/or 96). As used herein, the terms "packaged," "packaging," and "pack" may refer to any suitable altering, combining, escaping, framing, and/or fragmenting of the message data 98. In certain embodiments, the network layer header data 122 and/or the network layer footer data 124 may include a MAC address of the source network device 12 (e.g., the network device 12 sending the message) and a MAC address of a destination network device 12 (e.g., the next network device 12 to receive the message). As may be appreciated, the MAC address of the destination network device 12 may not necessarily be the MAC address of the network device 12 having the target address 108 because the message data 98 may get routed through different internal networks 36, 38, 40, 42, 44 to reach the network device 12 having the target address 108. The network layer header data 122 and/or the network layer footer data 124 is used to move the message data 98 within a network toward the network device 12 having the target address.

Figure 9:
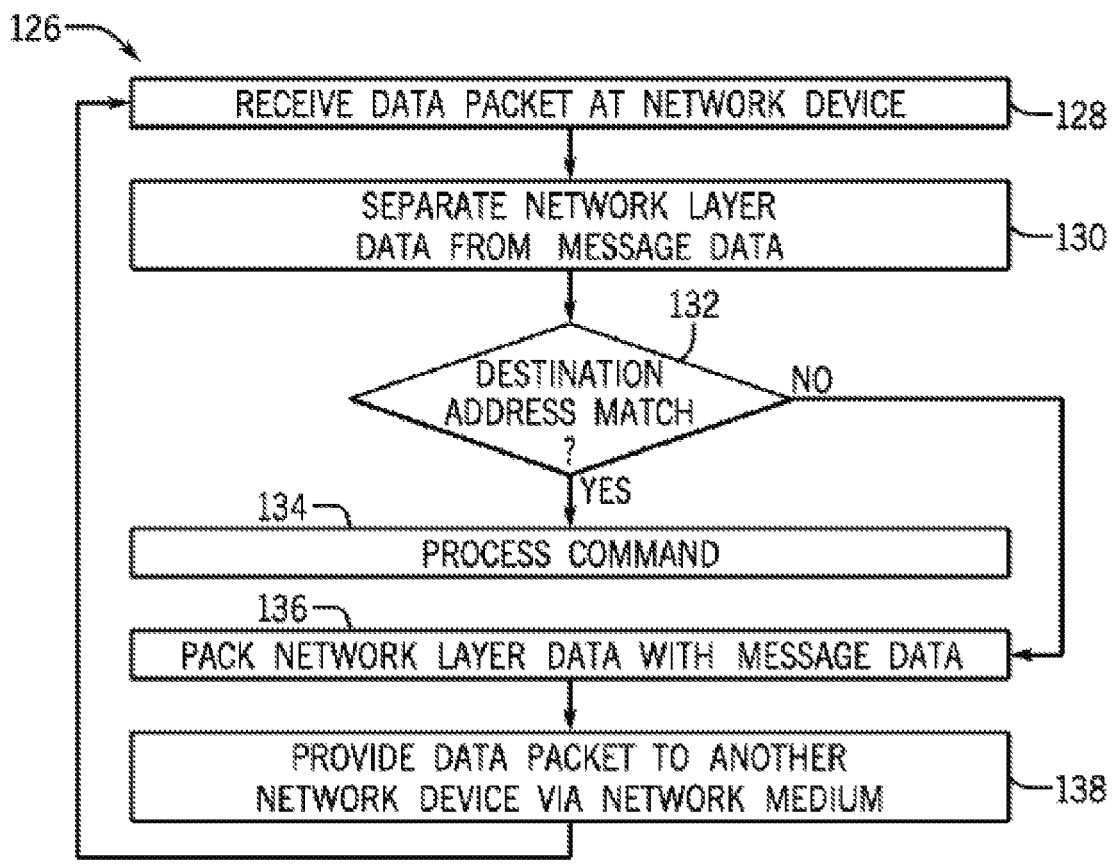
FIG. 9 is a flow chart of an embodiment of a method for handling a data packet in a welding system having network devices in different internal networks, in accordance with embodiments of the present disclosure.

FIG. 9 is a flow chart of an embodiment of a method 126 for handling the data packet 120 in the welding system 10 having the network devices 12 in different internal networks 36, 38, 40, 42, 44. A network device 12 receives the data packet 120 (block 128). The network device 12 separates network layer data (e.g., the network layer header data 122 and/or the network layer footer data 124) from the message data 98 (block 130). In certain embodiments, the network layer data includes a destination MAC address corresponding to the network device 12. The network device 12 determines whether the target address 108 (e.g., destination address) of the message data 98 matches an address of the network device 12 (block 132). If the target address 108 matches the address of the network device 12, the network device 12 processes the format identifier 110 of the message data 98 (block 134).

However, if the target address 108 does not match the address of the network device 12, the network device 12 packs new network layer data with the same message data 98 it received (block 136). In certain embodiments, the new network layer data includes a source MAC address corresponding to the network device 12. The network device 12 then provides the data packet 120 to a second network device 12 via a network medium (block 138). As may be appreciated, the new network layer data may include a destination MAC address corresponding to the second network device 12. Furthermore, in certain embodiments, the second network device 12 may be a router. The method 126 then returns to block 128.

By using the methods and systems described herein, messages may be communicated between network devices 12 within a welding system 10. The messages may be provided by one network device 12 and may be communicated through one or more internal networks 36, 38, 40, 42, 44 to reach a destination network device 12. The addresses used within the welding system 10 may be single-byte addresses, thereby facilitating a low amount of header data for transmitted messages. Furthermore, the messages may be received by a network device 12 exactly as the message was sent from another network device 12.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A network device of a first welding-related device, the network device comprising:
a processor configured to form message data,
the message data comprising a message header and a message payload,
the message header consisting of four bytes and comprising a source address, a destination address, a format identifier, and a message type comprising a wrapping counter consisting of six bits or less,
the wrapping counter skipping the value of zero when counting, and
the message type using one bit and the wrapping counter to indicate whether the message data is a broadcast message, a registered message, a command message, or a response message; and
a network interface configured to:
receive the message data from the processor, combine the message data with network layer data to form a data packet, and
provide the data packet to a second network device of a second welding-related device,
each of the first welding-related device and the second welding-related device comprising a welding power supply, a welding wire feeder, a welding torch, a welding helmet, a welding control pendant, or a welding foot pedal.

2. The network device of claim 1, wherein the processor comprises a reduced instruction set (RISC) processor.

3. The network device of claim 1, wherein the message type is indicative of whether the message data is a broadcast message, a registered message, a command message, or a response message.

4. The network device of claim 1, further comprising a second network interface, wherein the network interface comprises a first network interface that is different from the second network interface, and wherein the first network interface and second network interface comprise an Ethernet interface, a serial interface, a USB interface, or a wireless interface.

5. The network device of claim 4, wherein the data packet comprises a first data packet, and the second network interface is configured to receive a second data packet from a third network device of a third welding-related device.

6. The network device of claim 5, wherein the network layer data comprises first network layer data, the message data comprises first message data, and the processor is further configured to separate second network layer data of the second data packet from second message data of the second data packet.

7. The network device of claim 6, wherein the message header comprises a first message header, the processor being further configured to determine whether the second message data comprises a command message, and, in response to determining the second message data does comprise the command message, identify a tag of the second message data, and form third message data comprising a third message header with the tag.

8. The network device of claim 7, wherein the tag is six bits.

9. The network device of claim 7, wherein the message type comprises a first message type, and the third message header comprises a third message type comprising the tag.

10. The network device of claim 1, wherein the source address and the destination address each consists of one byte.

11. The network device of claim 1, wherein the format identifier identifies a format of the message payload.

12. The network device of claim 1, wherein the network layer data comprises a media access control (MAC) address corresponding to the second network device.

13. The network device of claim 1, wherein the message type comprises seven or eight bits.

14. The network device of claim 1, wherein the wrapping counter having the value of zero is indicative of the message data being the broadcast message or the registered message.

15. The network device of claim 14, wherein the message type uses a single bit to indicate whether the message data is intended for a whole of a welding system, or a specific internal network of the welding system, the welding system comprising the first welding-related device and the second welding-related device.

16. The network device of claim 1, wherein the processor is configured to control welding or determine welding operation quality.

17. The network device of claim 16, further comprising memory circuitry storing welding data.

18. The network device of claim 1, wherein the counter is representative of a number of messages sent by the network device.

* * * * *